United States Patent [19]

Sakamoto et al.

[11] Patent Number: 4,481,678
[45] Date of Patent: Nov. 6, 1984

[54] SIGNAL RECEIVING CIRCUIT FOR OPTICAL COMMUNICATION

[75] Inventors: Fukuma Sakamoto; Shizuo Izumida, both of Osaka, Japan

[73] Assignee: Sumitomo Electric Industries, Inc., Osaka, Japan

[21] Appl. No.: 405,066

[22] Filed: Aug. 4, 1982

[30] Foreign Application Priority Data

Aug. 6, 1981 [JP] Japan ............................. 56-123207

[51] Int. Cl.³ ............................................. H04B 9/00
[52] U.S. Cl. ..................................... 455/619; 455/237
[58] Field of Search ............... 455/237, 310, 607, 606, 455/619, 618

[56] References Cited

U.S. PATENT DOCUMENTS 3,356,794 12/1967 Felix ..................................... 455/310
3,885,143 5/1975 Ishii ..................................... 235/181
4,330,870 5/1982 Arends ................................. 455/617
4,399,565 8/1983 Jarret et al. .......................... 455/612

FOREIGN PATENT DOCUMENTS 56-102140 1/1980 Japan ................................... 455/619

Primary Examiner—Joseph A. Orsino, Jr.
Assistant Examiner—Timothy K. Greer
Attorney, Agent, or Firm—Harness, Dickey & Pierce

[57] ABSTRACT

A signal receiving circuit for optical communication, which receives light modulated with frequencies corresponding to two values, to receive data, comprises an addition circuit provided in the front stage of a demodulator, the addition circuit adapted to superpose on an electrical signal provided by converting light received a signal having a frequency which is smaller in amplitude than the electrical signal.

5 Claims, 7 Drawing Figures

SIGNAL RECEIVING CIRCUIT FOR OPTICAL COMMUNICATION

BACKGROUND OF THE INVENTION

This invention relates to a signal receiving circuit in optical communication, and is intended to prevent an erroneous operation in signal reception when an optical input is not available at all.

FIG. 1 shows an optical communication system using transceivers each of which is obtained by combining a transmitter and a receiver together. In FIG. 1, reference numerals 1 and 2 designate transceivers which are obtained by combining signal receiving circuits 1a and 2a and signal transmitting circuits 1b and 2b, respectively. Data communication using two values "0" and "1" for instance, is carried out between the transceivers 1 and 2 in the manner to be described.

Data corresponding to the value "0" is communicated by transmitting light which is modulated with a frequency $f_1$, and data corresponding to the value "1" is communicated by transmitting light which is modulated with a frequency $f_2$.

In a conventional signal receiving circuit, as shown in FIG. 2, an optical input which is modulated with the frequencies $f_1$ and $f_2$ is converted into an electrical signal by a light receiving element, 3 and the electrical signal thus obtained is amplified by an amplifier 4 and are converted into binary data by a demodulator 5. In this case, where the gain of the amplifier 4 has been increased in order to receive even a small optical input, the amplifier 4 outputs random signals owing to noise or the like even when no optical input is available at all because of a failure in the signal transmitting system. Therefore, depending on the demodulator, random data are outputted, thus causing an erroneous operation in signal reception.

Furthermore if the gain of the amplifier 4 is decreases in order to prevent the aforementioned erroneous operation, it is impossible to receive a small optical input.

When no optical input is received at all, it should be determined that a trouble occurs in the signal transmitting system, and it is necessary to provide an identification signal therefor, which is difficult.

SUMMARY OF THE INVENTION

In view of the above-described difficulties, an object of this invention is to provide a signal receiving circuit for optical communication in which the aforementioned erroneous operation in signal reception is prevented. The foregoing object of the invention has been achieved by the provision of a signal receiving circuit for optical communication, which receives light modulated with frequencies corresponding to two values, to receive data, in which, according to the invention, a circuit is provided in the front stage of a demodulator, which is adapted to superpose a signal having a frequency which is smaller in amplitude than an electrical signal which is obtained by converting light received on the electrical signal.

DESCRIPTION OF THE PREFERRED EMBODIMENTS

This invention will be described with reference to FIGS. 3 through 7.

Figure 1:
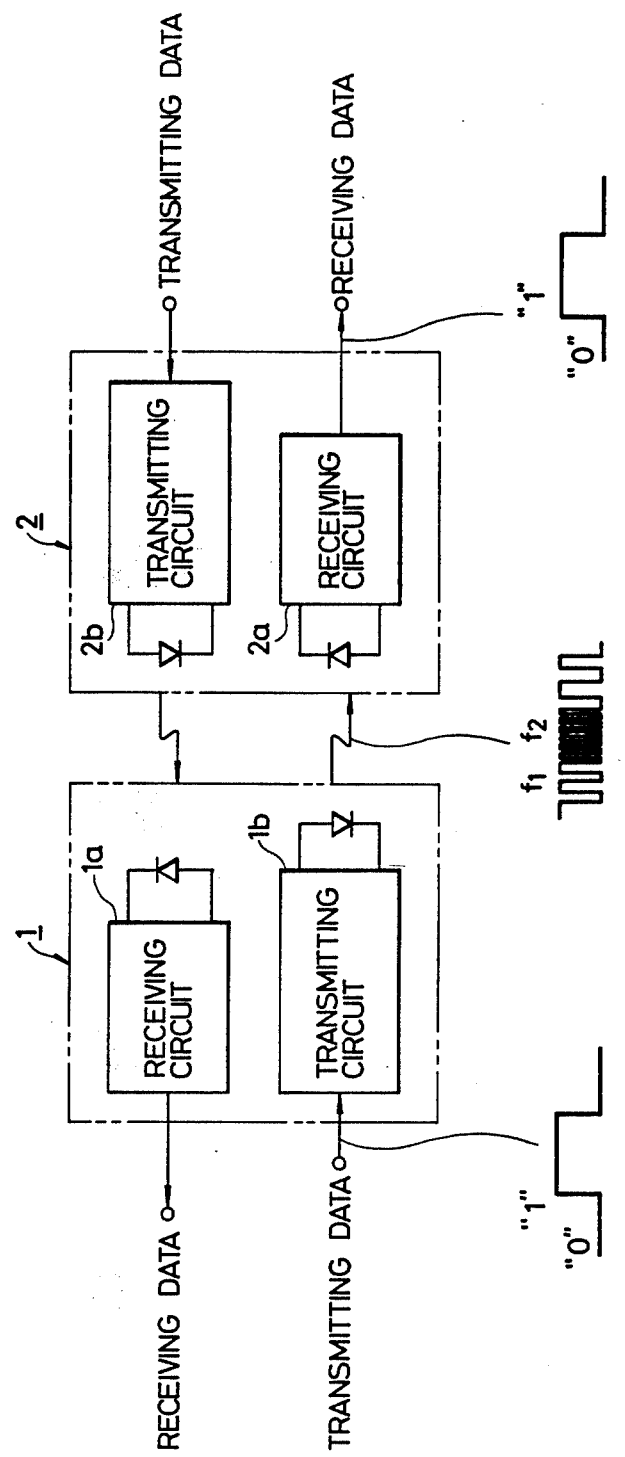
FIG. 1 is a block diagram showing an example of a conventional optical communication system.
Figure 2:
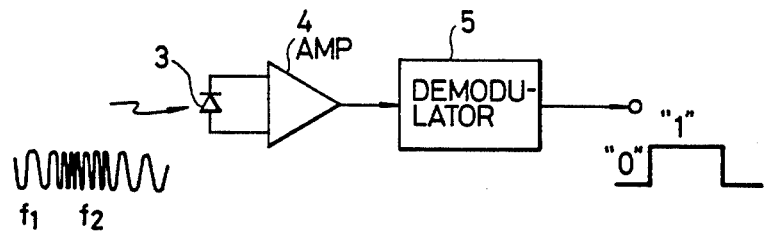
FIG. 2 is a block diagram of the conventional signal receiving circuit of the communication system shown in FIG. 1.
Figure 3:
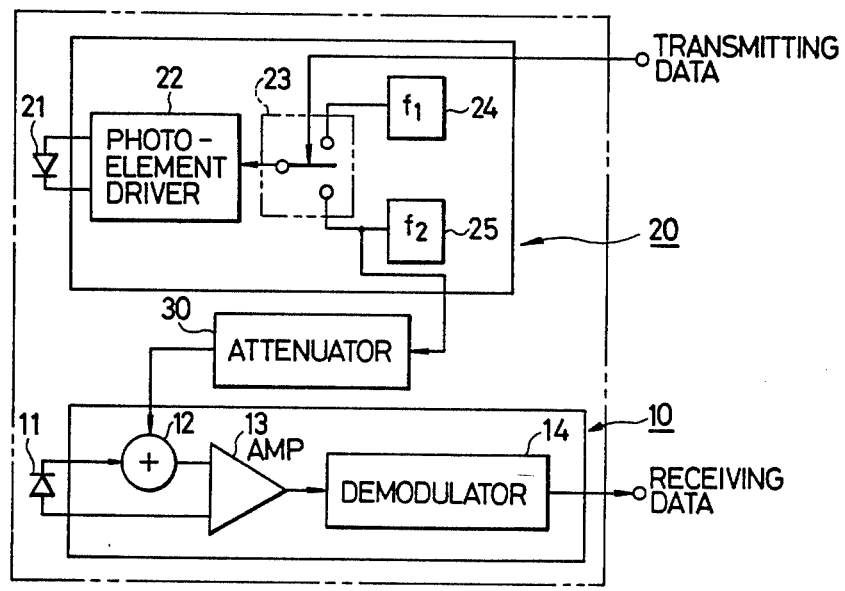
FIG. 3 is a block diagram showing a first embodiment of the invention.

FIG. 3 shows a first embodiment of the invention. In the embodiment, the technical concept of the invention is applied to an optical communication transceiver in which a transmitter and a receiver form one unit. In FIG. 3, reference numeral 10 designates a receiver, 11, a light receiving element, 12, an addition circuit, 13, an amplifier, 14, a demodulator, 20, a transmitter, 21, a light emitting element, 22, a driver, 23, a frequency change-over switch, 24 and 25, signal sources having modulating frequencies $f_1$ and $f_2$, respectively, and 30, an attenuator.

As is apparent from FIG. 3, the addition circuit 12 is connected between the light receiving element 11 and the amplifier 13. The signal of one of the modulating frequencies $f_1$ and $f_2$ in the transmitter—for instance the signal of the modulating frequency $f_2$—is applied through the attenuator 30 to the addition circuit 12, and the output of the latter 12 is applied to the amplifier 13. In this case, the level of the signal of $f_2$ applied to the addition circuit 12 is set lower than the estimated lowest level of an electrical signal from the light receiving element 11. That is, if the amplifier 13 is of saturation type, a low level signal is scarcely provided at the amplifier output because of the saturation of a high level signal. Accordingly, adjustment of the attenuator 30 makes it possible that, when an optical input exists, only an electrical signal corresponding to the optical input is outputted by the amplifier 13 and a superposition signal $f_2$ is substantially masked, and when no optical input exists, the superposition signal is effectively amplified and outputted. Therefore, even when the optical input does not exist at all, the amplifier 13 output the signal $f_2$, and the demodulator 14 outputs for instance the data "1" corresponding to the signal $f_2$, even if the demodulator 14 is of FM detection type or of band pass type. That is, unlike the prior art, random data will never be outputted. Accordingly, the sensitivity of the amplifier 13 can be set sufficiently high. As the same data is continuously outputted as described above, the signal reception is carried out correctly at all times, and a trouble in the transmitter of the other party or a failure in the optical transmission path can be recognized. If, even in the case where the amplifier 13 is not of saturation type, the demodulator is of FM detection type, the low level signal is masked because of the detection characteristic. Therefore, only in the case when no optical input exists at all, the data "1" corresponding to the superposition signal $f_2$.

Figure 4:
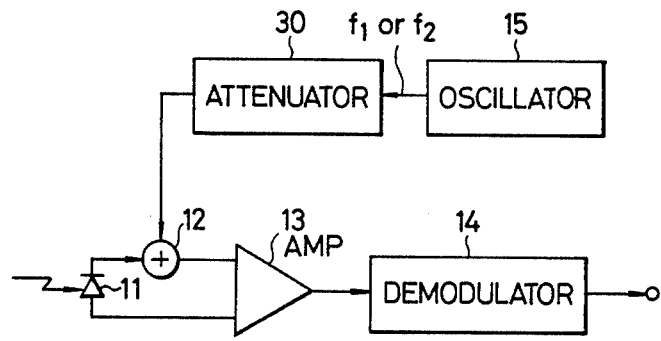
FIG. 4 is a block diagram showing another embodiment of the invention.

FIG. 4 is a block diagram of a second embodiment of the invention, showing a single receiver. In the embodiment, an oscillator 15 for oscillating a frequency $f_1$ or $f_2$ is separately provided for the signal receiving circuit, and the oscillation output is applied through an attenuator 30 to an addition circuit. The operation is similar to that of the circuitry in FIG. 3.

Figure 5:
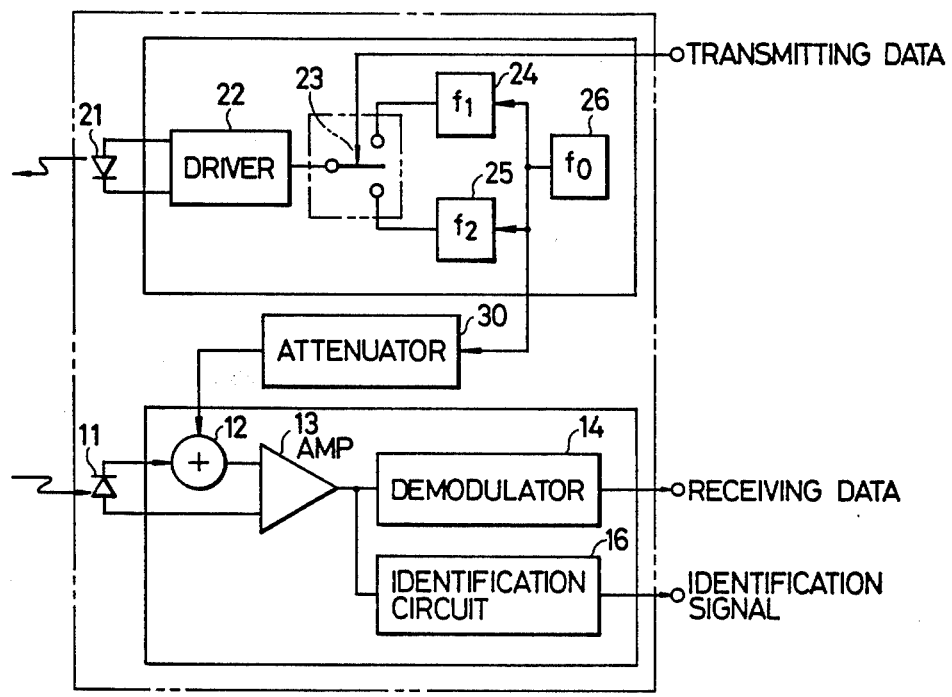
FIG. 5 is a block diagram showing a still further embodiment of the invention.
Figure 6:
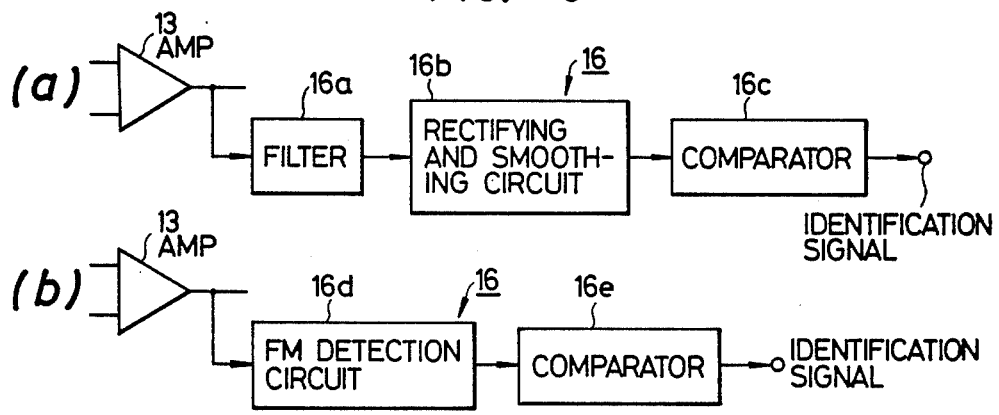
FIG. 6(a) is a block diagram of an identifying circuit that may be used in conjunction with the embodiment of FIG. 5.
FIG. 6(b) is a block diagram of another identifying circuit that may be used with the embodiment of FIG. 5.

FIG. 5 shows a third embodiment of the invention, in which a signal whose frequency is different from modulating frequencies is subjected to superposition. In the embodiment also, a transmitter and a receiver form one unit. The technical concept of the invention is applied to the transceiver where, in order to provide modulating frequencies $f_1$ and $f_2$, an oscillator 26 whose oscillation frequency $f_0$ is different from $f_1$ and $f_2$ is provided in the transmitter. The frequency $f_0$ may be higher or lower than the frequencies $f_1$ and $f_2$. As is apparent from FIG. 5, in the embodiment also, the signal $f_0$ is applied to the attenuator 30 so that the level of the signal becomes lower than an electrical signal from the light receiving element 11. The signal $f_0$ thus treated is applied to the addition circuit 12. The receiver has an identification circuit 16, the examples of which are as shown in the parts (a) and (b) of FIG. 6. The circuit shown in the part (a) of FIG. 6 comprises a band-pass filter 16a whose pass frequency is $f_0$, and if necessary, a rectifying and smoothing circuit 16b and a comparator 16c. The identification circuit in the part (a) of FIG. 6 is effective in the case where the amplifier 13 is of saturation amplification type. Since the superposition signal $f_0$ is scarcely outputted when an optical input exists and the superposition signal $f_0$ is outputted when no optical input exists, the presence or absence of an optical input can be determined according to the level of the signal which is available at the rear stage of the band-pass filter 16a. The circuit shown in the part (b) of FIG. 6 is effective in the case where the amplifier 13 is of non-saturation amplification type, and comprises an FM detection circuit 16d and a comparator 16e. In the circuit shown in the part (b) of FIG. 6, even if the superposition signal $f_0$ is considerably included in the output of the amplifier 13 irrespective of the presence or absence of an optical input, because of the characteristic of the FM detection circuit 16d a signal having a level corresponding to the signal $f_1$ or $f_2$ is outputted when an optical input exists, and a signal having a level corresponding to the signal $f_0$ is outputted when no optical input exists. Therefore, the absence of an optical input can be determined by discrimination of the signal levels.

It is assumed that the demodulator 14 is of FM detection type in the embodiment shown in FIG. 5. If, under this condition, no optical input exists, the signal "1" or "0" corresponding to the frequency $f_0$ is continuously outputted similarly as in the cases of FIGS. 3 and 4. However, it is immediately determined from the output signal of the identification circuit 16 that the output is different from one provided by the continuation of the signal $f_1$ or $f_2$, and therefore the occurrence of a trouble in the transmitter the other party or the occurrence of a failure in the optical transmission line can be identified. On the other hand, if the demodulator 14 is of band-pass type, then random data are outputted when no optical input is available; however, the data in this case can be made ineffective by the output of the identification circuit 16, and therefore an erroneous operation in signal reception can be prevented. In the case where the demodulator 14 is of FM detection type, the detection output is applied to a comparator corresponding to the signal $f_0$, so that the level thereof is determined to decide the presence or absence of an optical input. In the embodiment shown in FIG. 5, the superposition signal $f_0$ is obtained from the oscillator 26 in the transmitter which form the transceiver with the receiver. However, in the case of a receiver only, an exclusive oscialltor should be provided similarly as in the case of FIG. 4.

Figure 7:
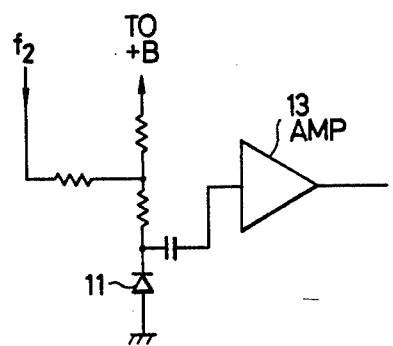
FIG. 7 is a circuit diagram showing a type of addition circuit that may be used in conjunction with the invention.

FIG. 7 shows one example of the addition circuit 12 described above. In the example, the superposition signal $f_1$, $f_2$ or $f_0$ is subjected to superposition by a resistor network in a photo-electric conversion circuit in the front stage of the amplifier 13; however, the arrangement of the addition circuit is not limited thereto or thereby. The addition circuit can be inserted in any place in the front stage of the demodulator. For instance in the case of a multi-stage amplifier, it may be inserted in the middle stage.

As is apparent from the above description, according to the invention, no erroneous operation in signal reception is caused even if no optical input is available.

What is claimed is:

1. A signal receiving circuit for optical data communication for preventing false signals during periods when no data is being transmitted comprising a light receiving element adapted to receive a data signal, an amplifier, a demodulator connected to an output of said amplifier, a signal source of a specific frequency, an attenuator having an input connected to said signal source for attenuating the amplitude of the specific frequency signal from said signal source to a value less than that of said data signal, and an addition circuit having one input from said light receiving element and a second input from said attenuator and connected to an input of said amplifier, said addition circuit superposing on a data signal received by said light receiving element said attenuated signal.

2. A signal receiving circuit as claimed in claim 1, further including a transmitting circuit for transmitting a signal represented by at least two different frequencies and said specific frequency is derived from one of the frequencies of said transmitting circuit.

3. A signal receiving circuit as claimed in claims 1 and 2, further comprising an identification circuit connected to said output of said amplifier for identifying said data signals.

4. A signal receiving circuit as claimed in claim 3, wherein said identification circuit consists of a band-pass filter, a rectifying and smoothing circuit and a comparator.

5. A signal receiving circuit as claimed in claim 3, wherein said identification circuit consists of an FM detection circuit and a comparator.

* * * * *